(12) United States Patent
Sidhu et al.

(10) Patent No.: US 7,206,963 B2
(45) Date of Patent: Apr. 17, 2007

(54) SYSTEM AND METHOD FOR PROVIDING SWITCH REDUNDANCY BETWEEN TWO SERVER SYSTEMS

(75) Inventors: Balkar S. Sidhu, San Jose, CA (US); Ramani Krishnamurthy, Fremont, CA (US); Kaamel Kermaani, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 566 days.

(21) Appl. No.: 10/459,882

(22) Filed: Jun. 12, 2003

(65) Prior Publication Data

US 2004/0255190 A1 Dec. 16, 2004

(51) Int. Cl.
*G06F 11/00* (2006.01)
(52) U.S. Cl. ............................................. 714/9
(58) Field of Classification Search .................... 714/9
See application file for complete search history.

(56) References Cited

U.S. PATENT DOCUMENTS

| | | | | |
|---|---|---|---|---|
| 5,971,804 A | * | 10/1999 | Gallagher et al. | 439/581 |
| 6,112,271 A | * | 8/2000 | Lanus et al. | 710/306 |
| 6,138,247 A | * | 10/2000 | McKay et al. | 714/10 |
| 6,161,197 A | * | 12/2000 | Lanus et al. | 714/11 |
| 6,209,051 B1 | * | 3/2001 | Hill et al. | 710/302 |
| 6,418,504 B2 | | 7/2002 | Conway et al. | |
| 6,425,027 B1 | | 7/2002 | Mills et al. | |
| 6,490,152 B1 | * | 12/2002 | White et al. | 361/684 |
| 6,496,940 B1 | * | 12/2002 | Horst et al. | 714/4 |
| 6,526,465 B1 | * | 2/2003 | Voth et al. | 710/301 |
| 6,581,125 B1 | * | 6/2003 | Lange et al. | 710/305 |
| 6,608,761 B2 | | 8/2003 | Wachel | |
| 6,854,072 B1 | * | 2/2005 | Cagle et al. | 714/15 |
| 2002/0124114 A1 | * | 9/2002 | Bottom et al. | 709/251 |
| 2003/0065861 A1 | * | 4/2003 | Clark et al. | 710/305 |
| 2003/0147375 A1 | * | 8/2003 | Goergen et al. | 370/351 |
| 2003/0179741 A1 | * | 9/2003 | Goergen | 370/351 |
| 2004/0073833 A1 | * | 4/2004 | Krishnamurthy et al. | 714/10 |
| 2004/0073834 A1 | * | 4/2004 | Kermaani et al. | 714/13 |

OTHER PUBLICATIONS

"PICMG 2.16 CompactPCI® Packet Switching Backplane," pp. 1-69, Aug. 28, 2001.

* cited by examiner

*Primary Examiner*—Bryce P. Bonzo
(74) *Attorney, Agent, or Firm*—Meyertons Hood Kivlin Kowert & Goetzel, P.C.; B. Noël Kivlin

(57) ABSTRACT

A system and method for providing switch redundancy in a computer network comprises two or more separate servers that are connected together to allow the servers to operate as one complete system that may continue to operate even in the event that one server becomes unable to provide switching functions. In one exemplary embodiment, the computer network includes two or more servers and a server bridging assembly. Two or more servers are interconnected via the server bridging assembly such that, in the event that a switch located in one of the servers fails, the switch located in the other server can be used to provide switching functions for both servers. As a result, the servers are interconnected to provide redundancy.

21 Claims, 1 Drawing Sheet

SYSTEM AND METHOD FOR PROVIDING SWITCH REDUNDANCY BETWEEN TWO SERVER SYSTEMS

BACKGROUND OF THE INVENTION

1. Field of the Invention

The present invention relates to computer systems and, more specifically, to providing switch redundancy between two servers.

2. Background

Generally, a server is a computer or device on a network that manages network resources. For example, a file server is a computer and storage device dedicated to storing files. Any user on the network can store files on the server. Other common examples include a print server, i.e., a computer that manages one or more printers, and a network server, i.e., a computer that manages network traffic. Another example of a server is a database server, i.e., a computer system that processes database queries.

Thus, servers may provide many different functions. For instance, servers may be utilized in internet services or applications, voice applications and storage applications, among other examples. Servers may be implemented by a wide variety of architectures that may be defined within existing standards, such as, for example, a PICMG (PCI Industrial Computer Manufacturers Group) standard, or a custom architecture.

Typically, several servers are interconnected to form a computer network, such as, for example, a LAN (local area network). Bridges, routers or switches may be used to divide the network into segments. For instance, dividing an Ethernet network into multiple segments is one of the most common ways of increasing available bandwidth on the LAN. Switches are used to filter and forward data between the servers and may support different communications protocols. Switches may also be used to join different segments. For example, switches may support the Ethernet protocol to provide, for example, a switched Ethernet LAN.

Because computer networks generally provide critical functions or services, system administrators strive to provide a network that is as robust as possible within the given technical and economic constraints. For example, providing redundant components is a common technique for improving the reliability of a computer network. In particular, a computer network may use redundant switches to ensure that that network continues to operate without a significant loss in performance in the event that a switch fails. Unfortunately, implementing redundant components invariably requires additional hardware and software and, as a result, additional expenses. In addition, existing hardware or software may be incompatible with additional devices or otherwise render redundant components infeasible. Accordingly, there is a need to provide redundancy in a switched computer network that avoids the problems associated with providing additional redundant components.

SUMMARY OF THE INVENTION

The present invention is directed to a system and method for providing switch redundancy in a computer network. In one exemplary embodiment, the computer network includes two or more servers and a server bridging assembly. The two servers are interconnected via the server bridging assembly such that, in the event that a switch located in one of the servers fails, the switch located in the other server can be used to provide switching functions for both servers. As a result, the servers are interconnected to provide redundancy.

In another exemplary embodiment, each server includes one or more node boards. Each node board comprises at least two node link ports, including a link port A and a link port B. Each server also contains a switch fabric card that includes several link ports to receive connections from the node cards. The link ports of the switch fabric card are grouped into several pairs of switch link port A and switch link port B network ports. The link port A for each node board is connected to an associated switch link port A of the switch fabric card located in the same server. The link port B for each node board is connected to an associated switch link port B of a switch fabric card located in a separate server via the server bridging assembly. Accordingly, each node board in the system is connected, via the node board's two link ports, to two separate switch boards, located in two separate servers. As a result, in the event of a failure of the node board's primary switch fabric card, e.g., the switch fabric card connected to the node board's link port A, the node board is still connected to a second switch fabric card located in the second server via the node board's link port B and the server bridging assembly. Therefore, the node board may still rely on the second switch fabric card to provide switching connectivity to other network components.

A more complete understanding of the system and method of the present invention will be afforded to those skilled in the art, as well as a realization of additional advantages and objects thereof, by a consideration of the following detailed description of the preferred embodiment. Reference will be made to the appended sheet of drawings which will first be described briefly.

DETAILED DESCRIPTION OF THE PREFERRED EMBODIMENT

Figure 1:
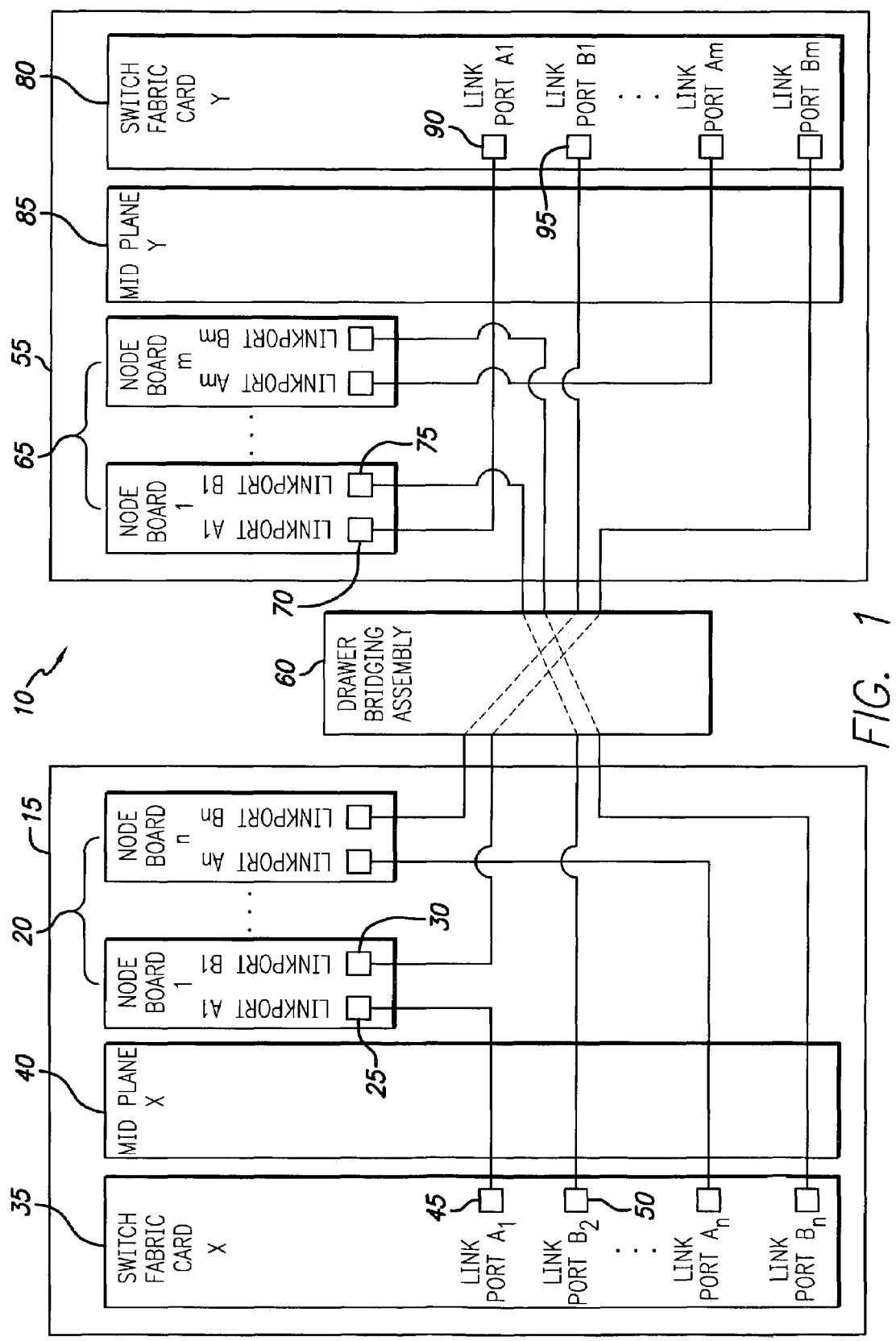
FIG. 1 is a block diagram of an exemplary embodiment of the computer network system of the present invention.

FIG. 1 shows an exemplary embodiment of the computer network system, shown generally at 10. Computer network system 10 may include two or more servers or drawers. In the exemplary embodiment shown in FIG. 1, computer network system includes two servers 15 and 55. It should be understood that the system and method of the present invention may include computer network systems that utilize more than two servers. Server 15 or 22 may be a computer, thin server, workstation, mainframe, or any other similar device suitable for managing network resources. In addition, server 15 may run client or server applications or programs. Server 15 may be implemented with any suitable server architecture or standard, e.g., an existing standard or a custom architecture. In one exemplary embodiment, server 15 utilizes a PICMG standard.

Server 15 includes one or more node boards, indicated at 20. Each node board 20 may provide a node or point of interconnection to the computer network system 10. Accordingly, each node board 20 may provide a terminal point at which data is transmitted, received, or repeated over network 10. Generally, a node may be considered as a stand-alone processor board and in the context of a server, a node board may be considered as a stand-alone server that coexists with other node boards inside a server. Each node board 20 includes two link ports 25 and 30, node link port An and node link port Bn, respectively, to provide communicative connections between node board 20 and other network devices.

Server 15 includes at least one switching card X, shown at 35, to perform switching functions for network 10 in accordance with a selected network or switching protocol. In a preferred exemplary embodiment, switching card X is a switch fabric card 35. In another preferred exemplary embodiment, switching card X provides switching functions pursuant to an Ethernet communications protocol. Accordingly, in this exemplary embodiment, network 10 includes two or more switch fabric cards, e.g., switch fabric card X 35 and Y 80, to implement a switching fabric. Generally, the switching fabric is the combination of hardware and software that moves data coming in to a network node, such as, for example, node 20, out by the correct port to the next node in the network. Typically, the switching fabric includes the switching units in a node, the integrated circuits that they contain, and the programming that allows switching paths to be controlled.

Switch fabric card X contains several pairs of network ports, 45 and 50, referred herein as switch link ports An and Bn, respectively, to provide for communication in accordance with a selected network protocol. In the exemplary embodiment shown in FIG. 1, An and Bn refer to link ports A and B, where n corresponds to the maximum number of node boards 20 supported by server 15. In a preferred exemplary embodiment, network ports 45 and 50 are Ethernet ports to allow data transmission in accordance with an Ethernet communications standard, as discussed above. For example, server 20 may implement an Ethernet based architecture compliant with the PICMG standard. In another preferred exemplary embodiment, switch link port An 45 is an Ethernet port and switch link port Bn serves as a redundant or backup port. In addition to providing a switching function, switch fabric card X may also contain other boards or components to provide additional functionality. For example, switch fabric card X may include a management controller to manage the operation of server 15.

Server 15 also includes midplane or backplane X, shown at 40. Midplane X 40 is a circuit board that includes slots or sockets to receive other circuit boards, expansion cards, or similar devices. Midplane X 40 may be either active or passive. For example, an active midplane 15 may contain, in addition to slots, logical circuitry that performs computing functions. Alternatively, midplane X 40 may be passive and contain almost no computing circuitry. Midplane X 40 allows node boards 20 and switch fabric card X 35 to be connected to server 15 and communicate with other devices connected to midplane X 40. As discussed above, each node board 20 includes node link port An 25 and node link port Bn 30, respectively, to provide communicative connections between node board 20 and other network devices. In particular, link port An of node boards 20 may be connected to switch link ports An of switch fabric card X 35 via midplane X 40. Node boards 20 may communicate by transferring or receiving packets via the switch fabric cards in network 10, including switch fabric card X 35. As a result, Node boards 20 may communicate with other node boards in network 10 and thereby form a switching fabric.

As discussed above, network 10 includes two or more servers. Accordingly, as shown in FIG. 1, network 10 also includes server 55. Server 55 includes node boards 65, midplane Y 85 and switch fabric card Y 80. Node boards 65 include node link port Am 70 and node link port Bm 75, respectively, to provide communicative connections between node board 65 and other network devices. In particular, link port Am of node boards 20 may be connected to switch link ports Am of switch fabric card Y 80 via midplane Y 85. In the exemplary embodiment of FIG. 1, Am and Bm refer to link ports A and B, respectively, and m corresponds to the maximum number of node boards 65 supported by server 55.

Network 10 also includes server bridging device or assembly 60. Server bridging assembly 60 may be any interconnect or device suitable for providing a communications connection between servers 15 and 55. For example, server bridging assembly 60 may be a cable, a PCB (printed circuit board), a flex cable or any other suitable interconnect device. Moreover, because network 10 may include more than two servers, server bridging assembly 60 may be able to interconnect more than two servers. As discussed above, each node board 20 located in server 15 includes a node link port Bn 30. As shown in FIG. 1, each node link port Bn 30 is connected to switch fabric card Y 80, located in the second server 55, via a corresponding switch link port B through drawer bridging assembly 60. Similarly, each node link port Bm 75 of the node boards 65 located in server 55 is connected to switch fabric card X 35, located in server 15, via a corresponding switch link port B 50, through bridging assembly 60. As a result, in the preferred exemplary embodiment described above, one Ethernet port of each node board is connected to the switch fabric card located in its server, and the other port (e.g., the redundant port) is connected, via the server bridging assembly 60, to the switch fabric card located in the other server. In this manner, the second port of each node board can connect to the spare Ethernet ports of the switch card located in the second server.

Accordingly, each node board in the network 10 is connected to two switch fabric cards, i.e., both switch fabric card X 35 and Y 80. In particular, each node board has one port, e.g., node link ports An 25 (for the first server 15) and Am 70 (for the second server 55), connected to the switch fabric card located in the node board's server and a redundant port, e.g., node link ports Bn 30 (for the first server 15) and Bm 75 (for the second server 55), connected to a switch fabric card located in a separate server. Therefore, the switch card in one server may connect to the node boards installed within the same server and, in addition, to the node boards in the second server.

Thus, in the event that a link port fails (e.g., link port A), the affected node board can communicate with the redundant switch card, e.g., the switch card located in the second server, through the other link port (e.g., link port B) that is connected to the redundant switch card via the server bridging assembly 60. Consequently, system operation can be maintained. Similarly, if one of the switch cards, e.g., Ethernet switch fabric card 35 or 80, were to fail, then the switch installed in the other server could be used to take over the failed switch's functions via the server bridging assembly 60 to allow network 10 to operate without a loss in performance.

For example, the node boards will determine that the link ports associated with the failing card are inoperative and will use the second link ports to communicate with the switch card in the second server and accordingly maintain system operation. Therefore, in the exemplary embodiment described above, the interconnection of the Ethernet ports allows for Ethernet redundancy between the two servers 15 and 55. As a result, server bridging assembly 60 communicatively connects servers 15 and 55 in order to allow the servers to operate in a redundant manner.

Having thus described a preferred embodiment of the computer network system of the present invention, it should be apparent to those skilled in the art that certain advantages of the present system have been achieved. It should also be appreciated that various modifications, adaptations, and alternative embodiments thereof may be made within the scope and spirit of the present invention. For example, a computer network system including two servers has been illustrated, but it should be apparent that the inventive concepts described above would be equally applicable to computer network systems with more than two servers. Moreover, although computer systems utilizing an Ethernet switch fabric and PICMG architecture has been illustrated, the present invention is equally applicable to other network protocols and server architectures or standards. The invention is further defined by the following claims.

What is claimed is:

1. A computer system network, comprising:
   a first server, comprising:
   a first node board operable to provide a first node associated with the first server;
   a first switch operable to communicatively couple a plurality of node boards and provide switching services for the first server;
   a second server, comprising:
   a second node board operable to provide a second node associated with the second server;
   a second switch operable to communicatively couple a plurality of node boards and provide switching services for the second server; and
   a bridging device operable to communicatively couple the first node board to the second switch and communicatively couple the second node board to the first switch such that the first switch is operable to provide switching function for the second server in the event the second switch fails and the second switch is operable to provide switching functions for the first server if the first switch fails.

2. The computer system network of claim 1, wherein: the first node board further comprises
   first and second node link ports, wherein the first and second node link ports are operable to transmit data in accordance with a selected communications protocol;
   the first switch further comprises first and second switch link ports, wherein the first and second switch link ports are operable to transmit data in accordance with the selected communications protocol, and wherein the first node link port is communicatively coupled to the first switch link port;
   the second node board further comprises third and fourth node link ports, wherein the third and fourth node link ports are operable to transmit data in accordance with the selected communications protocol;
   the second switch further comprises third and fourth switch link ports, wherein the third and fourth switch link ports are operable to transmit data in accordance with the selected communications protocol, and wherein the third node link port is communicatively coupled to the third switch link port; and the bridging device is operable to communicatively couple the second node link port to the fourth switch link port and communicatively coupled the fourth node link port to the second switch link port.

3. The computer system network of claim 2: wherein the first server further comprises a first midplane, wherein the first midplane is operable to communicatively couple the first node board and the first switch with the first server; and wherein the second server further comprise a second midplane, wherein the second midplane is operable to communicatively couple the second node board and the second switch with the second server.

4. The computer system network of claim 3: wherein the first midplane is operable to communicatively couple the bridging device to the first switch and the first node board; and wherein the second midplane is operable to communicatively couple the bridging device to the second switch and the second node board.

5. The computer system network of claim 4, wherein the first and second midplane each comprise an active midplane.

6. The computer system network of claim 4, wherein the first and second midplane each comprise a passive midplane.

7. The computer system network of claim 2, wherein the first and second switch each comprise a switching card.

8. The computer system network of claim 7, wherein the first and second switch each comprise a switch fabric card.

9. The computer system network of claim 8: wherein the selected communications protocol comprises an Ethernet communications protocol; and wherein the first and second switch are operable to transmit data in accordance with the Ethernet communications protocol.

10. The computer system network of claim 2, wherein the first and second server are based on a PCI Industrial Computer Manufacturers Group (PICMG) standard.

11. The computer system network of claim 2, wherein the bridging device comprises a cable operable to transmit data in accordance with the selected communications protocol.

12. The computer system network of claim 2, wherein the bridging device comprises a printed circuit board (PCB).

13. The computer system network of claim 2, wherein the bridging device comprises a flex cable operable to transmit data in accordance with the selected communications protocol.

14. A method for providing switch redundancy between a first server and a second server, the method comprising:
   communicatively coupling the first server to the second server through a bridging device;
   detecting a failure of a component located in the first server that reduces the ability of the first server to provide switching functions;
   and assuming the switching functions for the first server by the second server via the bridging device;
   wherein the first server comprises a first switch and a first node board, and the second server comprises a second switch and a second node board, wherein the first node board further comprises first and second node link ports, wherein the first switch further comprises first and second switch link ports, wherein the second node board further comprises third and fourth node link ports, wherein the second switch further comprises third and fourth switch link ports, wherein the method further comprises:
   communicatively coupling the first node link port to the first switch link port;
   communicatively coupling the third node link port to the first switch link port;
   communicatively coupling the second node link port to the fourth switch link port; and
   communicatively coupling the fourth node link port to the second switch link port to thereby allow the first server and the second server to operate in a redundant manner.

15. The method of claim 14, wherein communicatively coupling the first server to the second server further comprises the step of transmitting data in accordance with a selected communications protocol via a cable.

16. The method of claim 14, wherein communicatively coupling the first server to the second server further comprises transmitting data in accordance with a selected communications protocol via a PCB.

17. The method of claim 14, wherein communicatively coupling the first server to the second server further comprises transmitting data in accordance with a selected communications protocol via a flex cable.

18. The method of claim 14, wherein detecting a failure of a component in the first server further comprises detecting a failure of a link port.

19. The method of claim 14, wherein detecting a failure of a component in the second server further comprises detecting a failure of a link port.

20. The method of claim 14, wherein detecting a failure of a component in the first server further comprises detecting a failure of the first switch.

21. The method of claim 14, wherein detecting a failure of a component the second server further comprises detecting a failure of the second switch.

* * * * *